(12) United States Patent
Rolandson

(10) Patent No.: US 11,767,784 B2
(45) Date of Patent: Sep. 26, 2023

(54) EXPANDER SYSTEM

(71) Applicant: Volvo Car Corporation, Gothenburg (SE)

(72) Inventor: Ola Rolandson, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 17/560,715

(22) Filed: Dec. 23, 2021

(65) Prior Publication Data

US 2022/0213828 A1 Jul. 7, 2022

(30) Foreign Application Priority Data

Jan. 4, 2021 (EP) .................................... 21150069

(51) Int. Cl.
*F01N 5/02* (2006.01)
*F02G 1/053* (2006.01)
(Continued)

(52) U.S. Cl.
CPC ............ *F01N 5/025* (2013.01); *F01C 19/125* (2013.01); *F01C 21/005* (2013.01); *F01D 11/04* (2013.01); *F01K 23/065* (2013.01); *F01K 23/10* (2013.01); *F01K 23/14* (2013.01); *F01K 25/08* (2013.01); *F02G 1/0535* (2013.01);
(Continued)

(58) Field of Classification Search
CPC .... F01C 19/125; F01C 21/005; F01K 23/065; F01K 23/10; F01K 23/06; F01K 23/14; F01K 25/08; F01K 25/10; F01K 7/36; F01N 5/025; F01D 11/04; F01D 11/06; F01D 11/003; F02G 1/0535; F02G 2253/03; F02G 2254/15; F02G 2290/00; F05D 2240/55; Y02T 10/12
See application file for complete search history.

(56) References Cited

U.S. PATENT DOCUMENTS 4,189,156 A * 2/1980 Geary, Jr. ............... F01D 11/04
  415/176
5,839,270 A   11/1998 Jirnov et al.
(Continued)

FOREIGN PATENT DOCUMENTS

DE   102014209894 A1   11/2015
EP        2025879 A2    2/2009
EP        3128137 A1    2/2017

OTHER PUBLICATIONS

Jun. 8, 2021 European Search Report issued in International U.S. Appl. No. 21150069.

*Primary Examiner* — Mickey France
(74) *Attorney, Agent, or Firm* — Clements Bernard Walker; Christopher L. Bernard

(57) ABSTRACT

An expander system for recovering waste heat, a waste heat recovery system including such an expander system, a vehicle including such a waste heat recovery system and a method for manufacturing such an expander system. The expander system includes a shaft and a coupling portion including a first sealing unit and a second sealing unit. The shaft is inserted through the coupling portion to an expanding unit. The first sealing unit and the second sealing unit are arranged facing one another along the shaft. The first sealing unit and the second sealing unit are configured to seal the shaft in an axial direction relative to the shaft.

14 Claims, 3 Drawing Sheets

(51) Int. Cl.
*F01K 23/14* (2006.01)
*F01C 21/00* (2006.01)
*F01D 11/04* (2006.01)
*F01K 23/10* (2006.01)
*F01K 25/08* (2006.01)
*F01C 19/12* (2006.01)
*F01K 23/06* (2006.01)

(52) U.S. Cl.
CPC ...... *F02G 2253/03* (2013.01); *F02G 2254/15* (2013.01); *F02G 2290/00* (2013.01); *F05D 2240/55* (2013.01)

(56) References Cited

U.S. PATENT DOCUMENTS

| | | | |
|---|---|---|---|
| 6,481,215 B1* | 11/2002 | Ikegami | F02G 1/0535 |
| | | | 60/520 |
| 2012/0230857 A1* | 9/2012 | Noguchi | F01C 19/125 |
| | | | 418/201.1 |
| 2013/0098037 A1 | 4/2013 | Maier | |
| 2017/0335966 A1* | 11/2017 | Werdecker | F04D 29/124 |
| 2018/0187566 A1* | 7/2018 | Gaia | F16J 15/40 |
| 2020/0392922 A1* | 12/2020 | Krebs | F02G 5/04 |

* cited by examiner

EXPANDER SYSTEM

CROSS-REFERENCE TO RELATED APPLICATION

The present disclosure claims the benefit of priority of co-pending European Patent Application No. 21 150 069.9, filed on Jan. 4, 2021, and entitled "EXPANDER SYSTEM," the contents of which are incorporated in full by reference herein.

TECHNICAL FIELD

The present disclosure relates to an expander system for recovering waste heat, a waste heat recovery system including such an expander system, a vehicle including such a waste heat recovery system and a method for manufacturing such an expander system.

BACKGROUND

A waste heat recovery system is integrated in a vehicle to convert heat generated in an internal combustion engine at a high temperature into additional mechanical energy, which can be further recovered either mechanically or electrically.

The waste heat recovery system includes a heater, an expander, a condenser and a piston pump circulating a working fluid to conduct a heat recovery process. When heating up the system, the working fluid evaporates to steam and pushes pistons in the expander for creating work on a rotating axle. The work from the expander can be used to propel the vehicle or to collect electrical energy in a battery. Accordingly, overall efficiency of the internal combustion engine and of the thus equipped vehicle is improved.

SUMMARY

Hence, there still may be a need to provide an improved an expander system, which further increases an efficiency of a vehicle.

The problem is solved by the subject matters of the independent claims of the present disclosure, wherein further embodiments are incorporated in the dependent claims. It should be noted that the aspects of the disclosure described in the following apply to the expander system for recovering waste heat, a waste heat recovery system including such an expander system, a vehicle including such a waste heat recovery system and a method for manufacturing such an expander system.

According to the present disclosure, an expander system for recovering waste heat is presented. The expander system includes a shaft and a coupling portion including a first sealing unit and a second sealing unit. The shaft is inserted through the coupling portion to an expanding unit. The first sealing unit and the second sealing unit are arranged facing one another along the shaft. The first sealing unit and the second sealing unit are configured to seal the shaft in an axial direction relative to the shaft.

The expander system according to the present disclosure ensures a reliable sealing of the expanding unit such that air may not penetrate to inside the expanding unit. Conventionally, the coupling portion includes only one sealing unit to seal the expanding unit or the shaft relative to each other. However, the conventional sealing unit may loose a sealing pressure, due to, for example a pressure difference between an interior of the expanding unit and an ambient pressure. The loss of the sealing pressure of the sealing unit may be even bigger, if the internal pressure of the expanding unit decreases below atmospheric pressure. In contrast, the first sealing unit and the second sealing unit arranged in the coupling portion according to the present disclosure may seal the shaft in an opposite direction relative to each other. Accordingly, the shaft may be hermetically sealed and no air may be penetrate into the expanding unit via the shaft, which may otherwise affect a working fluid inside the expanding unit.

The expanding unit may be configured to extract an energy by an expansion of a compressed medium resulting in a low pressure while the medium passes through an inlet to an outlet. Further, the expanding unit may be configured to convert the extracted energy to a mechanical power, which may be further converted to an electrical power via a generator.

The coupling portion may be arranged around a longitudinal axis of the shaft to connect the shaft and the expanding unit. In other words, the longitudinal axis of the shaft may pass through the coupling portion to couple with the expanding unit. The coupling portion may be directly arranged at the expanding unit or spaced apart from the expanding unit.

The first sealing unit and the second sealing unit may also be arranged around the longitudinal axis of the shaft and may be configured to seal the coupling portion against the shaft in the axial direction of the shaft. The first sealing unit and the second sealing unit may be formed as a ring-shape around the shaft. The first sealing unit and the second sealing unit may face each other along the shaft in the coupling portion. In other words, the first sealing unit and the second sealing unit may be arranged parallel along the shaft so that they may exert a sealing force in an opposite direction.

Accordingly, each sealing unit may seal the shaft from a centre of the coupling portion to an outside of the coupling portion along the longitudinal axis of the shaft. Alternatively, the first sealing unit and the second sealing unit may seal the shaft in a same direction such that the first sealing unit may seal the shaft from the centre to the outside of the coupling portion and the second sealing unit may seal the shaft from the outside to the centre of the coupling portion and vice versa.

In an embodiment, the coupling portion includes a through-hole arranged in a perpendicular direction relative to the shaft between the first sealing unit and the second sealing unit, wherein the through-hole is connected to a pressure inlet of the expanding unit. The trough-hole may extend from an outer surface of the coupling portion to the shaft. The coupling portion may also include more than one through-hole along a circumferential surface of the coupling portion.

In an embodiment, the pressure inlet of the expanding is configured to allow a medium to enter, which has a higher pressure than atmospheric pressure. The medium may be, for example, a gas such as air, a fluid such as water or any organic/inorganic fluid. The medium may be compressed before entering the pressure inlet. The pressurised medium may be directed to an interior of the expanding unit, in which the medium expanded. The pressure inlet may be additionally guided to the coupling portion to provide the compressed medium.

Accordingly, a pressurized medium may flow into the through-hole between the first sealing unit and the second sealing unit from the pressure inlet. Since inside the coupling portion the compressed medium flows, which may have a pressure higher than the ambient atmosphere, i.e. 101 kPa, the first sealing unit and the second sealing unit may effect outwardly in the axial direction of the shaft. Hence, air may not enter to the coupling portion, thus, the expanding unit may be hermetically evacuated and the medium existing inside the expanding unit may not be affected by an air intrusion.

In an embodiment, the through-hole connects an interior of the first sealing unit and an interior of the second sealing unit. Accordingly, the compressed medium may not only flow in the through-hole between the first sealing unit and the second sealing unit, but may enter into a chamber of each sealing unit. Thus, a sealing pressure of the first sealing unit and the second sealing unit may be effectively exerted outwardly from the centre of the coupling portion, where the pressure is smaller than the pressure inside the coupling portion. Accordingly, an air intrusion into the coupling portion and expanding unit may be prevented.

In an embodiment, the expanding unit further includes a pressure outlet. During an expansion of the compressed medium, a mechanical work may be conducted by the shaft, which may be forwarded to a generator or a transmission to convert it to another energy such as an electricity. After the expansion, the medium may be released out of the expanding unit to further receive the compressed working medium. The medium passing the pressure outlet, thus leaving the expanding unit may have a smaller pressure than atmospheric pressure, i.e. below 99 kPa due to the expansion.

Since the pressure inside the expanding unit, particularly at the pressure outlet side, may be lower than the ambient pressure of the expanding unit, an air intrusion may occur if the sealing in the coupling portion leaks. However, the first and the second sealing unit may seal the coupling portion with a high pressure than the ambient (atmospheric) pressure according to the present disclosure, an air intrusion from the ambient into the expanding unit via the coupling portion may be prevented.

In an embodiment, the expanding unit further includes more than one channel connecting the pressure inlet and the through-hole. In other words, at least one channel may connect the pressure inlet and the through-hole to provide the compressed working medium. The expanding unit may include a second channel to draw the medium out of the through-hole, hence allowing a circulation of the pressurised medium between the pressure inlet and the coupling portion. Additionally or alternatively the expanding unit may include a further channel for degassing and flushing other channels.

In an embodiment, the channels are arranged to circulate the medium between the pressure inlet and the through-hole of the coupling portion substantially without a pressure drop. When circulating the pressurised medium between the pressure inlet and the coupling portion, the pressure of the medium may be substantially maintained to provide a reliable seal inside the coupling portion. The term "substantially" may be understood that even a small pressure drop in the coupling portion, the pressure of the medium has to be still higher than the ambient atmospheric pressure.

In an embodiment, the first and/or second sealing unit includes a lip seal. The first and/or the second sealing unit may be a radial, rotary or linear shaft seal including an additional lip in a circumferential direction of the seal. In an embodiment, the first and/or second sealing unit includes a labyrinth seal or a U-shaped seal. The first sealing unit and the second sealing unit may ensure a hermetical seal between the coupling portion and the shaft to prevent an air intrusion into the expanding unit.

In an embodiment, the expanding unit further includes a piston expander. The piston expander generally shows lower internal leakages and may operate at lower rotational speeds of the shaft, which makes it directly attached to a generator without any transmission means such as a gearbox. The piston expander may be configured to generate a sub-atmospheric pressure at the pressure outlet. Accordingly, a performance of the expander may be improved as the sub-atmospheric pressure would cause a suction force on the piston expander. Hence, an efficiency of the expander system may be increased. However, the expanding unit may also be a scroll expander, a screw expander or a rotary vane expander.

In an embodiment, the medium is ethanol. Ethanol has a relative lower boiling point in comparison with other fluids. Hence, ethanol may be suitable as a low temperature heat source, which may evaporate and recover thermal energy from low-grade heat sources. This may increase an efficiency of the expander system. If air penetrates into the expanding unit, however, ethanol may oxidise and degrade, which would decrease the efficiency of the expander system. The expander system according to the present disclosure may prevent the air intrusion into the expanding unit. Hence, a reliable heat recovery using the stable working medium may be ensured. The medium may also be water or any other organic fluids.

According to the present disclosure, also a waste heat recovery system is presented. The waste heat recovery system includes an expander system as described above and a generator. A shaft of the expander system is configured to be connected to the generator and the generator is configured to convert an energy transferred from the shaft to a mechanical and/or electrical energy. Accordingly, the generator may convert the energy to propel a vehicle or collect an electrical energy in a battery system, which may be utilized for various electrical inputs.

The waste heat recovery system may use an effective cooling downstream the expander system, which may create a sub-atmospheric pressure inside an expanding unit. By providing the first sealing unit and the second sealing unit facing one another along the shaft, an air intrusion in to the expanding unit via the shaft and/or the coupling portion may be prevented. Accordingly, an efficient waste heat recovery may be achieved.

In an embodiment, the waste heat recovery system is an organic Rankine system. Accordingly, the waste heat recovery system may apply an organic fluid such as ethanol as a working fluid and convert heat into a mechanical work while a phase of the working fluid changes. Since the organic fluid has a relative lower boiling point, the waste heat recovery system may be operated at low temperatures, which may lead to an efficient waste heat recovery.

According to the present disclosure, also a vehicle is presented. The vehicle includes a waste heat recovery system is described above. The generator coupled with the expander system may enable converting the waste heat available in the exhaust gas into electricity that can be stored and utilized for various electrical inputs so that the fuel efficiency can be improved. The waste heat recovery system may be integrated in vehicles including a diesel internal combustion engine (ICE) or petrol ICE.

According to the present disclosure, also a method for manufacturing an expander system for recovering waste heat is presented. The method includes the steps of: providing a shaft, providing a coupling portion including a first sealing unit and a second sealing unit, inserting the shaft through the coupling portion to an expanding unit, and arranging the first sealing unit and the second sealing unit facing one another along the shaft. The first sealing unit and the second sealing unit are configured to seal the coupling portion in an axial direction relative to the shaft.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF THE DRAWINGS

Exemplary embodiments of the disclosure will be described in the following with reference to the following drawings.

DESCRIPTION OF EMBODIMENTS

Figure 1:
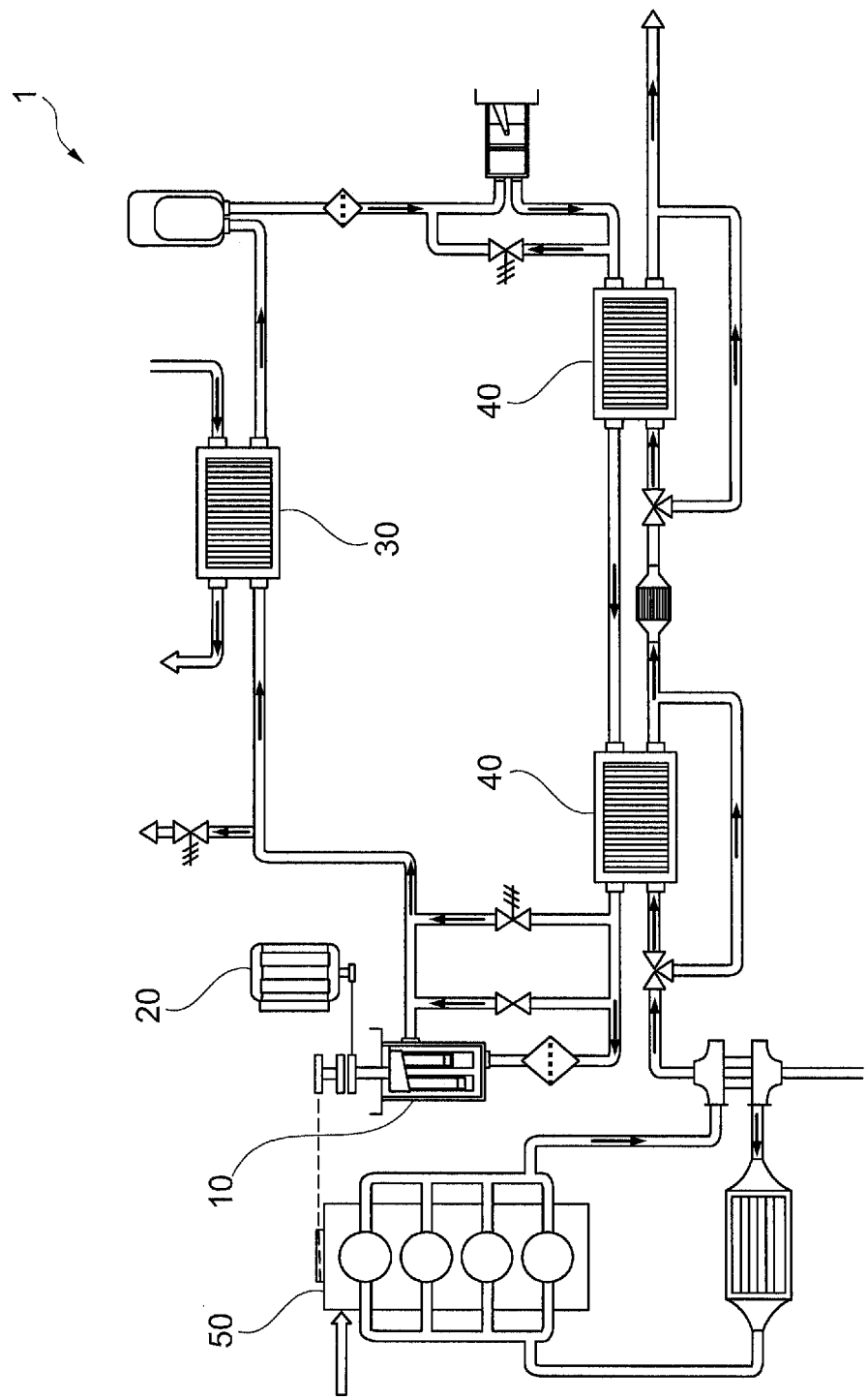
FIG. 1 shows schematically and exemplarily an embodiment of a waste heat recovery system according to the present disclosure.

FIG. 1 shows a waste heat recovery system 1, which may be integrated in a vehicle including a diesel internal combustion engine (ICE) or a petrol ICE 50. The waste heat recovery system 1 includes an expander system 10 and a generator 20. The waste heat recovery system 1 further includes a condenser 30 and a heat exchanger 40 for transferring heat from or to a working medium respectively, which circulates in the waste heat recovery system 1. The waste heat recovery system 1 may be an organic Rankine system and the working medium may be an organic fluid such as ethanol.

Figure 2:
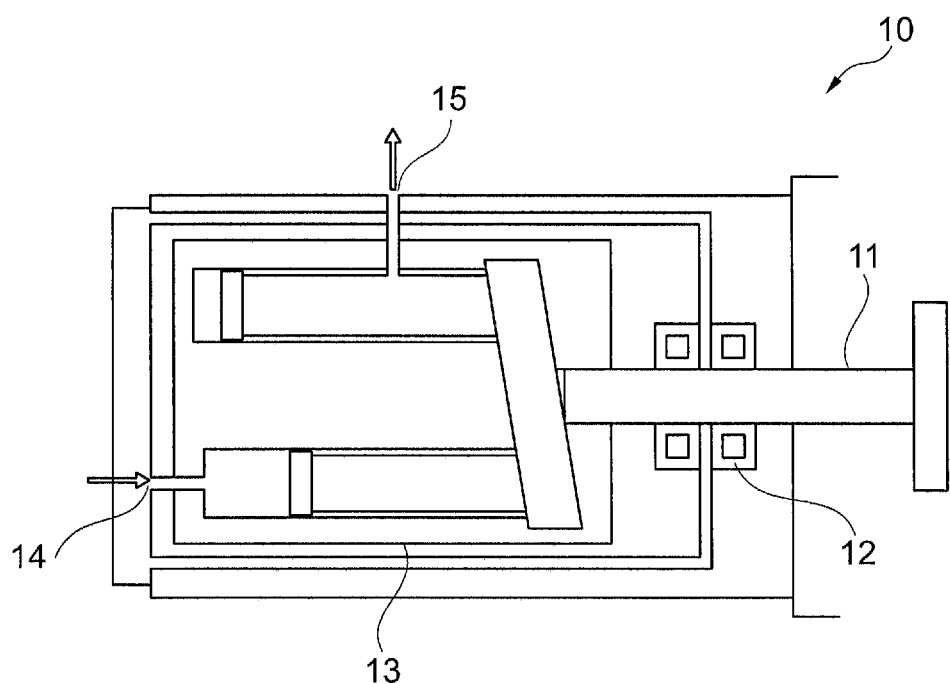
FIG. 2 shows schematically and exemplarily an embodiment of an expander system according to the present disclosure.

As shown in FIG. 2, the expander system 10 includes an expanding unit 13, which is connected to the generator 20 via a shaft 11. The generator 20 is configured to convert a mechanical work of the expanding unit 13 for propelling the vehicle or collecting an electrical energy in a battery system. The shaft 11 is inserted to the expanding unit 13 through a coupling portion 12, which may be arranged directly at the expanding unit 13.

The coupling portion 12 includes a first sealing unit 16 and a second sealing unit 17, which face each other along a longitudinal axis of the shaft 11. In other words, the first sealing unit 16 and the second sealing unit 17 are arranged around the shaft 11. The first sealing unit 16 and the second sealing unit 17 are configured to seal the coupling portion 12 in an axial direction relative to the shaft 11. The first and/or the second sealing unit 16, 17 may be a lip seal or a labyrinth seal.

Figure 3:
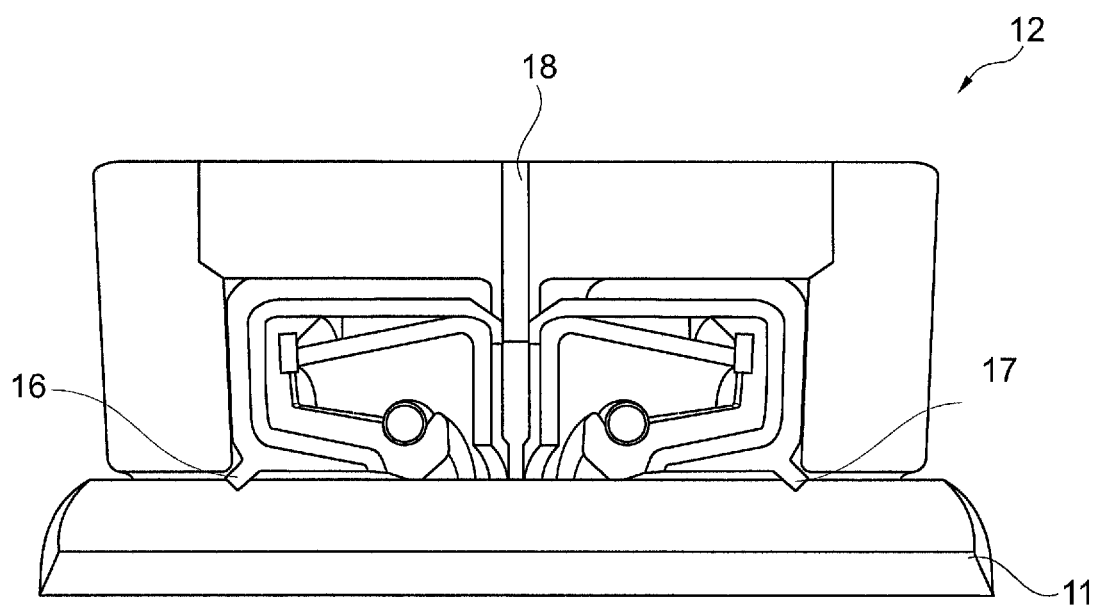
FIG. 3 shows schematically and exemplarily an embodiment of a coupling portion of an expander system according to the present disclosure.

The coupling portion 12 includes a through-hole 18 arranged in a perpendicular direction relative to the shaft 11 between the first sealing unit 16 and the second sealing unit 17. The through-hole 18 connects an interior of the first sealing unit 16 and an interior of the second sealing unit 17 (see also FIG. 3).

The expanding unit 13 includes a pressure inlet 14 for receiving a compressed working medium and a pressure outlet 15 for releasing the expanded working medium. Accordingly, the working medium entering in the expanding unit 13 has a higher pressure than the working medium exiting the expanding unit 13. The pressure of the working medium entering through the pressure inlet 14 may be preferably higher than atmospheric pressure.

The through-hole 18 arranged in the coupling portion 12 is connected to the pressure inlet 14 of the expanding unit 13 via a channel. The channel is configured to circulate the pressurised medium between the pressure inlet 14 and the through-hole 18 substantially without any pressure drop. Accordingly, the first sealing unit 16 and the second sealing unit 17 are pressed outwardly from a centre of the coupling portion 12. In other words, the first sealing unit 16 and the second sealing unit 17 exert a sealing force outwardly from a centre of the coupling portion 12 along a longitudinal axis of the shaft 11. Hence, the coupling portion 12 may be hermetically sealed and an intrusion of air in to the expanding unit 13 along the shaft 11 may be prevented.

The expanding unit 13 further includes a piston expander. The piston expander is configured to generate a sub-atmospheric pressure at least at the pressure outlet 15. Accordingly, a performance of the expander can be improved as the sub-atmospheric pressure would cause a suction force on the piston expander. Hence, an efficiency of the expander system 10 may be increased.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An expander system for recovering waste heat, comprising:
   a shaft; and
   a coupling portion comprising a first sealing unit and a second sealing unit,
   the shaft being inserted through the coupling portion to an expanding unit,
   the first sealing unit and the second sealing unit being arranged facing one another along the shaft,
   the first sealing unit and the second sealing unit being configured to seal the shaft in an axial direction relative to the shaft, and the coupling portion comprising a through-hole arranged in a perpendicular direction relative to the shaft between the first sealing unit and the second sealing unit, the through-hole being fluidly connected to a pressure inlet of the expanding unit via a channel.

2. The expander system according to claim 1, the through-hole connecting an interior of the first sealing unit and an interior of the second sealing unit.

3. The expander system according to claim 1, the expanding unit further comprising a pressure outlet.

4. The expander system according to claim 1, the pressure inlet of the expanding unit being configured to allow a medium to enter, which has a higher pressure than atmospheric pressure.

5. The expander system according to claim 1, the expanding unit further comprising more than one channel connecting the pressure inlet and the through-hole.

6. The expander system according to claim 5, the channels being arranged to circulate a medium between the pressure inlet and the through-hole of the coupling portion substantially without a pressure drop.

7. The expander system according to claim 1, the first and/or second sealing unit comprising a lip seal.

8. The expander system according to claim 1, the first and/or second sealing unit comprising a labyrinth seal.

9. The expander system according to claim 1, the expanding unit further comprising a piston expander.

10. The expander system according to claim 4, the medium being ethanol.

11. A waste heat recovery system, comprising:
an expander system comprising a shaft and a coupling portion comprising a first sealing unit and a second sealing unit, the shaft being inserted through the coupling portion to an expanding unit, the first sealing unit and the second sealing unit being arranged facing one another along the shaft, the first sealing unit and the second sealing unit being configured to seal the shaft in an axial direction relative to the shaft, and the coupling portion comprising a through-hole arranged in a perpendicular direction relative to the shaft between the first sealing unit and the second sealing unit, the through-hole being fluidly connected to a pressure inlet of the expanding unit via a channel; and
a generator,
the shaft of the expander system being configured to be connected to the generator, and
the generator being configured to convert an energy transferred from the shaft to a mechanical and/or electrical energy.

12. The waste heat recovery system according to claim 11, being an organic Rankine system.

13. A vehicle, comprising the waste heat recovery system according to claim 11.

14. A method for manufacturing an expander system for recovering waste heat, comprising the following steps:
providing a shaft;
providing a coupling portion comprising a first sealing unit and a second sealing unit;
inserting the shaft through the coupling portion to an expanding unit; and
arranging the first sealing unit and the second sealing unit facing one another along the shaft,
the first sealing unit and the second sealing unit being configured to seal the coupling portion in an axial direction relative to the shaft, and
the coupling portion comprising a through-hole arranged in a perpendicular direction relative to the shaft between the first sealing unit and the second sealing unit, the through-hole being fluidly connected to a pressure inlet of the expanding unit via a channel.

* * * * *